Sept. 5, 1933.  E. TIMBS  1,925,349
ROTARY DRAW WORKS
Filed May 21, 1929   2 Sheets-Sheet 1
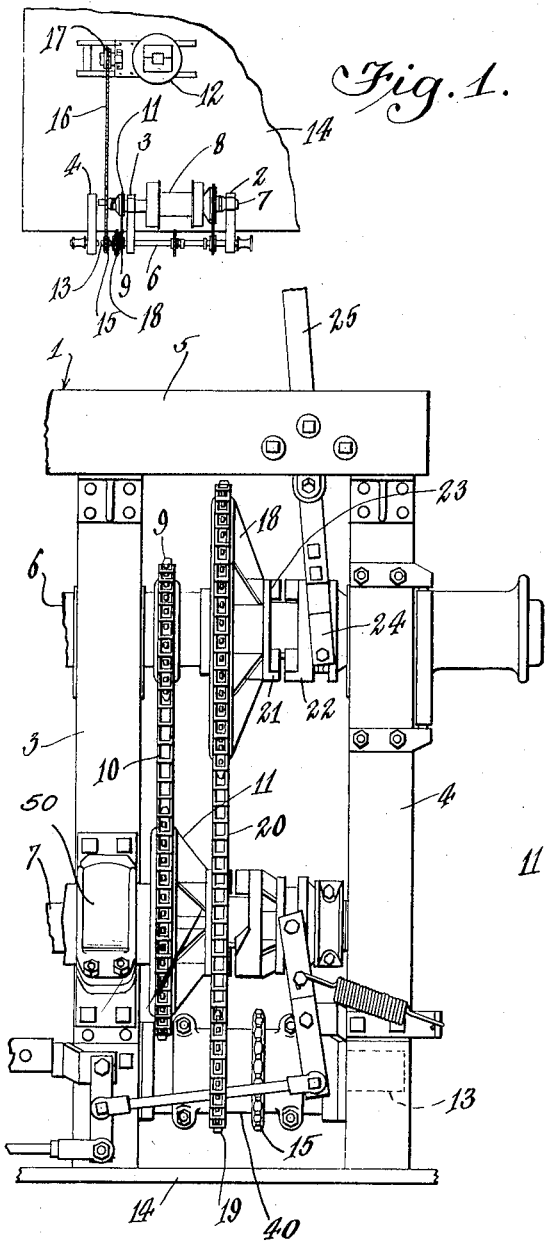
Fig. 1.
Fig. 2.
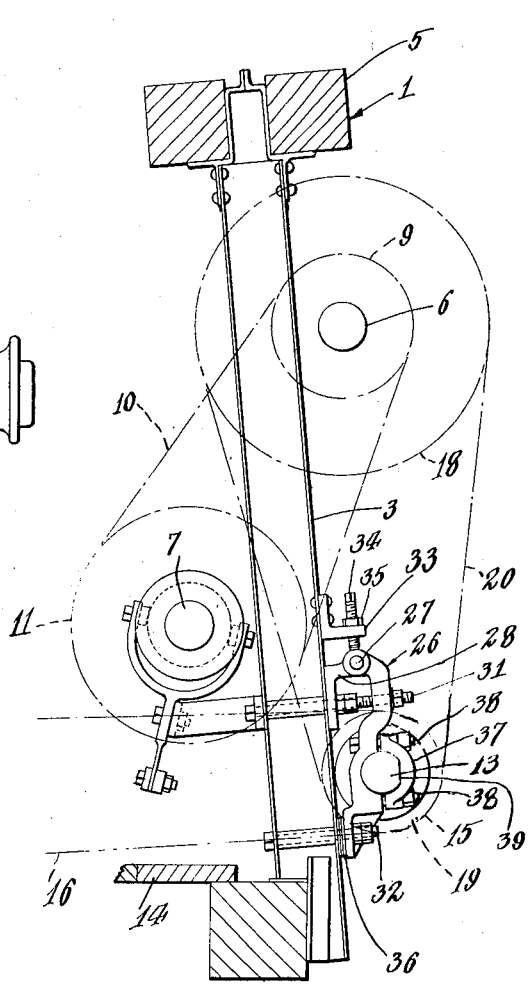
Fig. 3.
Inventor
Edward Timbs
By Lyon & Lyon
Attorneys Sept. 5, 1933.  E. TIMBS  1,925,349
ROTARY DRAW WORKS
Filed May 21, 1929   2 Sheets-Sheet 2
Fig. 5.
Fig. 4.
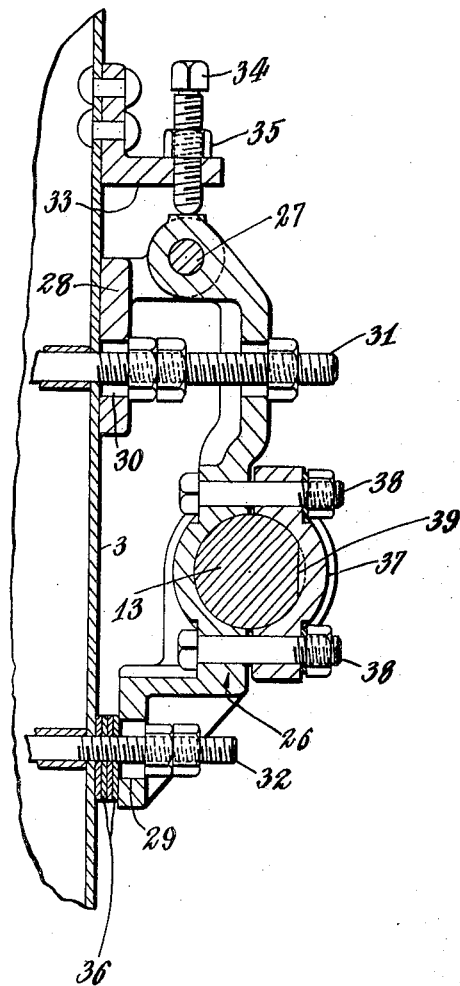
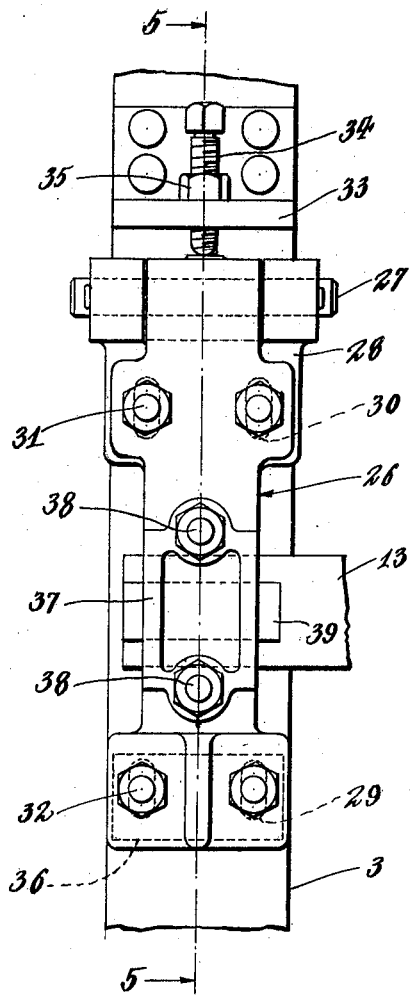
Inventor
Edward Timbs
By Lyon+Lyon
Attorneys Patented Sept. 5, 1933

1,925,349

UNITED STATES PATENT OFFICE 1,925,349

ROTARY DRAW WORKS

Edward Timbs, Los Angeles, Calif., assignor to The National Supply Company of Delaware, New York, N. Y., a corporation of Delaware Application May 21, 1929. Serial No. 364,755

5 Claims. (Cl. 255—19)

This invention relates to rotary drawworks as used in connection with a rotary process of drilling wells. In rotary drawworks as commonly constructed there is provided a frame work including three posts upon which there is supported a drum shaft and a line shaft. The line shaft is driven from a prime mover and a driving connection is formed from the line shaft to a rotary machine. The line shaft is supported near the upper end of the posts and the driving connection from the line shaft to the rotary machine usually includes a sprocket mounted on the line shaft which is connected through a chain with the rotary table drive sprocket.

It is an object of this invention to provide a means for driving a rotary machine from a rotary drawworks including a jack shaft supported by the posts of the drawworks at a point near the lower end of the posts or near the floor of the rig within which the drawworks is mounted and on the rear of said posts and from which jack shaft a drive connection is formed to the rotary machine.

Another object of this invention is to provide a rotary drawworks including a line shaft, a drum shaft and a jack shaft located at a point near the floor of the drawworks.

Other objects and advantages of this invention it is believed will be apparent from the following detailed description of a preferred embodiment thereof as illustrated in the accompanying drawings.

In the drawings:

Figure 1 is a diagrammatic view illustrating a rotary drawworks embodying this invention as operatively connected with a rotary machine.

Figure 2 is a fragmental view of a rotary drawworks embodying this invention.

Figure 3 is a side elevation thereof.

Figure 4 is an enlarged rear elevation of the jack shaft supporting bearing bracket embodied in this invention.

Figure 5 is a sectional edge elevation thereof taken substantially on the line 5—5 of Figure 4.

In the preferred embodiment of this invention illustrated in the accompanying drawings, there is disclosed a rotary drawworks including a frame 1 composed of spaced posts 2, 3 and 4 connected together by a cross-beam 5. Rotatably supported by the posts 2, 3 and 4 on the rear thereof is a line shaft 6. Journaled in bearings 50 secured to the posts 2 and 3 is a drum shaft 7 carrying a drum 8. The drum shaft 7 is driven from the line shaft 6 through a plurality of drive connections composed of sprockets 9 secured to the line shaft 6 over which chains 10 are trained, and which chains pass over corresponding sprockets 11 mounted on the drum shaft 7. The drum shaft 7 is supported on the front face of the posts 2 and 3 below the line shaft 6. The line shaft 6 is, as in accordance with common practice, mounted at a point near the upper end of the posts 2, 3 and 4.

Means are provided for driving rotary machine 12 from the rotary drawworks, which means are preferably of the following construction:

A jack shaft 13 is adjustably supported from the rear of the posts 3 and 4 of the rotary drawworks at a point near the floor 14 of the derrick within which the drawworks is mounted. The jack shaft 13 is mounted near the floor and at the rear of the posts 3 and 4 and is provided with a rotary drive sprocket 15 over which a chain 16 is trained. The chain 16 passes over the drive sprocket 17 of the rotary drawworks and thus passes from the drawworks to the rotary machine close to the floor. The jack shaft 13 is driven from the line shaft 6 by means of a sprocket and chain drive consisting of the sprocket 18 which is journaled on the line shaft 6 and a corresponding sprocket 19 mounted on the jack shaft 13. A chain 20 connects the sprockets 18 and 19. A clutch 21 is provided for releasibly engaging the sprocket 18 with the line shaft 6 and includes a clutch collar 22 splined on the line shaft 6 in position to engage the clutch face 23 of the sprocket 18. A shifting fork 24 is operatively connected with the clutch collar 22 and is pivotally connected by a bracket supported by the beam 5. The opposed end 25 of the actuating fork 24 may be connected by any suitable form of link mechanism extending to a point of accessibility in the derrick.

Means are provided for adjustably mounting the jack shaft 13, which are herein illustrated as including a bearing bracket 26, which is pivotally secured by a pin 27 to a bracket plate 28. Elongated slots 29 are formed in the opposed ends of the bearing bracket 26 and a corresponding elongated slot 30 is formed in the bearing plate 28. Bolts 31 and 32 are passed through these elongated slots and through the posts 3 and 4 of the rotary drawworks.

An adjustment bracket 33 is secured to each of the posts 3 and 4 in position so that its adjustment screw 34 engages the bearing bracket 26. The adjustment screw 34 is screw-threaded through the bearing bracket 33 and is provided with a lock nut 35. By adjusting the screw 34, the vertical position of the jack shaft 13 may be adjusted as the bearing bracket 26 and bearing plate 28 are moved vertically as permitted by the elongated slots 29 and 30. This vertical adjustment of the jack shaft 13 provides a means for taking up slack of the drive chain 20 from the line shaft 6 to the jack shaft 13.

Means are also provided for adjusting the position of the jack shaft 13 transversely of the posts 3 and 4, which means preferably include a plurality of shims 36 which are interposed between the lower end of the bearing bracket 26 and the posts 3 and 4 on the lower bolt 32.

By adding to or taking away shims 36, the shaft 13 may be adjusted in transverse position as the bearing bracket 26 pivots on the pin 27. A clamping cap 37 is secured to the bearing bracket 26 by means of bolts 38. The clamping cap 37 holds the shaft 13 from revolving by providing a flat face 39 which engages a flat portion of the shaft 13. The rotary drive sprocket 15 is journaled on jack shaft 13.

A sleeve 40 is journaled on the jack shaft 13 and carries the sprocket 19 and the rotary machine drive sprocket 15. The sleeve 40 is of sufficient longitudinal extent to fill the line shaft between the bearing brackets 26 to hold the sprockets 15 and 19 in correct longitudinal position on the shaft 13.

Having fully described my invention, it is to be understood that I do not wish to be limited to the details herein set forth, but my invention is of the full scope of the appended claims.

I claim:

1. In a rotary drawworks, the combination of a frame including a pair of spaced posts, a line shaft rotatably supported by said posts near their upper ends and upon the rear of said posts, a drum shaft supported on the said frame in spaced relation to said line shaft and on the front face of said frame, a jack shaft supported by said posts below said drum shaft in close proximity to the lower ends of said posts and on the back faces of said posts, means for driving the drum shaft from the line shaft, a rotary drive sprocket journaled on the jack shaft, and means for driving the rotary drive sprocket from the line shaft.

2. In a rotary drawworks, the combination of a frame including a pair of spaced posts, a line shaft rotatably supported by said posts near their upper ends and upon the rear of said posts, a drum shaft supported on the said frame in spaced relation to said line shaft and on the front face of said frame, a jack shaft supported by said posts below said drum shaft in close proximity to the lower ends of said posts and on the back faces of said posts, means for driving the drum shaft from the line shaft, a rotary drive sprocket journaled on the jack shaft, means for driving the rotary drive sprocket from the line shaft, the latter said means including a sprocket mounted on the line shaft, a sleeve journaled on the jack shaft upon which the rotary drive sprocket is secured, a second sprocket secured to the said sleeve, means connecting the latter said sprocket and the said line shaft sprocket, and clutch means for releasibly securing the line shaft sprocket to the line shaft.

3. In a rotary drawworks, the combination of a frame including a pair of spaced posts, a line shaft rotatably supported by said posts near their upper ends, a drum shaft supported on said frame in spaced relation to the line shaft, a jack shaft supported by said posts below said drum shaft in close proximity to the lower ends of said posts and from the rear faces of said posts, means for driving the drum shaft from the line shaft, a rotary drive sprocket journaled on the jack shaft, means for driving the rotary drive sprocket from the line shaft, means for adjusting the vertical position of the jack shaft, and means for adjusting the horizontal position of the jack shaft.

4. In a rotary drawworks, the combination of a frame including a pair of spaced posts, a line shaft rotatably supported by said posts near their upper ends, a drum shaft supported on said frame in spaced relation to said line shaft, a jack shaft supported by said posts below said drum shaft in close proximity to the lower ends of said posts and from the rear faces of said posts, said jack shaft supporting means including a bracket adjustably secured to each of said posts, means for adjusting the vertical position of said brackets, a rotary machine drive sprocket mounted on the jack shaft, and means for driving the rotary machine drive sprocket from the line shaft.

5. In a rotary drawworks, the combination of a frame, including a pair of spaced posts, a line shaft rotatable supported by said posts near their upper ends, a drum shaft supported on said frame in spaced relation to said line shaft, a stationary jackshaft supported by said posts in close proximity to the lower ends of said posts and upon the rear faces of said posts, said jackshaft support including brackets, means for pivotally and slidably securing the brackets to the post to enable adjustment of both the vertical and horizontal position of said jackshaft, a sleeve journaled on the jackshaft, a driven sprocket on the sleeve, means for driving the driven sprocket from the line shaft, and a rotary machine drive sprocket mounted on the sleeve.

EDWARD TIMBS.